US006902309B2

(12) United States Patent
Uemura et al.

(10) Patent No.: US 6,902,309 B2
(45) Date of Patent: Jun. 7, 2005

(54) LIGHT-EMITTING UNIT AND ILLUMINATION DEVICE AND IMAGE READING DEVICE USING LIGHT-EMITTING UNIT

(75) Inventors: Yoshiyuki Uemura, Osaka (JP); Tomihisa Saito, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 97 days.

(21) Appl. No.: 10/193,026

(22) Filed: Jul. 9, 2002

(65) Prior Publication Data
US 2003/0012036 A1 Jan. 16, 2003

(30) Foreign Application Priority Data

| Jul. 9, 2001 | (JP) | ........... 2001-207292 |
| May 13, 2002 | (JP) | ........... 2002-137496 |
| May 13, 2002 | (JP) | ........... 2002-137497 |

(51) Int. Cl.[7] .............................................. F21V 7/04
(52) U.S. Cl. ................. 362/555; 362/800; 361/813; 257/666; 358/484
(58) Field of Search ..................... 362/31, 223, 555, 362/800; 257/666, 676, 677; 361/813; 358/475, 484

(56) References Cited

U.S. PATENT DOCUMENTS

| 4,920,074 | A | * | 4/1990 | Shimizu et al. ............. 257/666 |
| 6,017,130 | A | * | 1/2000 | Saito et al. ................. 362/223 |
| 6,357,903 | B1 | * | 3/2002 | Furusawa et al. ........... 362/555 |
| 6,504,097 | B2 | * | 1/2003 | Kobayashi et al. ......... 257/676 |
| 6,621,223 | B1 | * | 9/2003 | Hen ........................... 257/676 |

FOREIGN PATENT DOCUMENTS

| JP | 08-163320 | 6/1996 |
| JP | 10-126581 | 5/1998 |

* cited by examiner

Primary Examiner—Stephen F Husar
(74) Attorney, Agent, or Firm—Merchant & Gould P.C.

(57) ABSTRACT

A light-emitting unit 20 has a light-emitting unit board 21 made of resin provided with a lead frame 22. The light-emitting unit board 21 is also provided with an open window 21a for mounting a light-emitting device. The lead frame 22 comprises a lead terminal section 22a, an inner lead section 22c, and a light-emitting device mounting and connecting section 22b which is exposed within the open window 21a. The light-emitting devices 23a, 23b, and 23c are bonded with the light-emitting device mounting and connecting section 22b, and electrodes of the light-emitting devices and the lead frame are connected by a metal wire 24, wherein the open window 21a is sealed by transparent resin. The lead frame 22 is made of iron-containing copper to improve heat radiation performance of the light-emitting unit board. By increasing maximum current to be supplied to the light-emitting diodes, it is possible to increase illumination brightness and to attain speedup of image reading.

5 Claims, 10 Drawing Sheets

LIGHT-EMITTING UNIT AND ILLUMINATION DEVICE AND IMAGE READING DEVICE USING LIGHT-EMITTING UNIT

BACKGROUND OF THE INVENTION

1. Field of the Invention

The present invention relates to a light-emitting unit, an illumination device for illuminating a document, and a contact-type image reading device (i.e., an image sensor) incorporating the illuminating device therein.

2. Description of the Prior Art

A contact-type image sensor is used as a device for reading a document using facsimile terminal equipment, a copying machine, an image scanner, etc. This contact-type image sensor is provided with a line illumination device for linearly illuminating a document surface over a main scanning range.

The line illumination device using a light guide is known and disclosed, for example, in Japanese Unexamined Patent Publication No. HEI 8-163320 (1996) and Japanese Unexamined Patent Publication No. HEI 10-126581 (1998) (Japanese Patent No. 2999431) in which the line illumination device using a bar-shaped or plate-shaped light guide and an image reading device using such a line illumination device are described.

FIG. 15 is a perspective view of a conventional bar-shaped line illumination device in which a bar-shaped light guide 101 is housed within a white casing 100 and a light-emitting unit 102 is secured to one end of the bar-shaped light guide 101. Light emitted from the light-emitting unit 102 is emitted toward a document surface from a light-emitting surface of the bar-shaped light guide 101 exposed from the casing 100 while reflecting the light within the bar-shaped light guide 101.

Structure of the light-emitting unit 102 is shown in FIG. 16, in which a light-emitting unit board 110 made of resin is provided with a window section 103. A light-emitting device 105 is bonded with a lead frame 104 facing the window section 103 by an adhesive agent 106 and connected to the lead frame 104 by a metal wire 107, wherein the window section 103 is sealed by transparent resin.

The lead frame 104 comprises a lead terminal section serving as an outer connecting terminal, an inner lead section, and a light-emitting device mounting and connecting section exposed within the window section 103. In the prior art, phosphor bronze is used as material for the lead frame 104, and silver paste formed by mixing resin with silver powder is used as material for the adhesive agent 106. An outer connecting terminal 104a of the lead frame 104 guided out of the light-emitting unit board 110 is adapted to solder the corresponding electric circuit.

If the brightness of the line illumination device is increased to increase the brightness of the illumination light for illuminating the reading surface of a document, it is possible to easily speed up the image reading. However, when an electric current sent to the light-emitting device is increased to increase the brightness of the line illumination device, calorific value of the light-emitting device is also increased accordingly. In this case, luminous efficiency decreases and as a result, there is a problem that it is difficult to increase the brightness.

When the electric current is supplied to the light-emitting device, junction temperature rises at the same time when light is emitted (i.e., heat is generated from the light-emitting device itself). Generated heat is transmitted or escapes to the side of the light-emitting unit board and finally radiated in the air. Accordingly, the rise of the junction temperature depends on the heat radiation characteristics of the light-emitting unit board and is substantially proportional to the supplied electric current. Namely, if the heat radiation characteristics of the light-emitting unit board are good or satisfactory, the rate of rise in the junction temperature becomes small.

On the other hand, to send an electric current to the light-emitting device (i.e., to turn on a light) at a high temperature leads to acceleration of deterioration of the light-emitting device. To lengthen the life, it is desirable that the temperature rise of the light-emitting device be controlled as much as possible. Accordingly, the better the heat radiation performance of the light-emitting unit board, the larger the maximum current which can be supplied to the light-emitting unit. The heat radiation performance of the light-emitting unit board varies with the shape, material or the like. In the prior art, phosphor bronze has been used for the material of the lead frame of the light-emitting unit board.

Namely, if the same level of brightness as before is required, the phosphor bronze can be used as the material for the lead frame, but the heat conductivity is not enough to obtain the higher or further brightness.

Solder used in the case where the outer connecting terminal of the lead frame is soldered to the corresponding electric circuit is generally an alloy of tin (Sn) and lead (Pb). However, there is a tendency to use the solder which does not contain the lead (i.e., lead-free solder) from the environmental point of view these days.

On the other hand, since material resin for the light-emitting unit board must stand the heat when soldered, polybutylene terephthalate (PBT) has been used in the prior art. A melting point of the polybutylene terephthalate is 200~210° C. and there was no problem because the melting point of a conventional solder (i.e., an alloy of tin and lead) is 186° C. However, since the melting point of the lead-free solder is 210~230° C., heat resistance is not enough in the case of polybutylene terephthalate (PBT).

By increasing the brightness of the light-emitting unit which is incorporated in the line illumination device, it is possible to speed up image reading, but there is caused a new problem that the luminous efficiency decreases when the temperature is high.

SUMMARY OF THE INVENTION

It is therefore an object of the present invention to improve these problems.

A light-emitting unit according to a first invention is provided, in which a lead frame disposed on a light-emitting unit board on which a light-emitting device is mounted is made of a copper alloy or an aluminum alloy of which the heat conductivity is 250 W/(m·K) or more.

The copper alloy includes beryllium bronze or iron-containing copper. A specific composition ratio of the iron-containing copper is as follows: Iron (Fe): 0.02~0.5 wt %; phosphorus (P): 0.005~0.10 wt %; the rest: copper (Cu)

By setting iron and phosphorus at the above ratio, it is possible to increase the strength while maintaining the heat conductivity high.

More desirable composition ratio of iron and phosphorus is as follows: Fe: 0.05~0.15 wt %; P: 0.015~0.04 wt %; the rest: Cu In addition to the above, material with high heat conductivity includes pure metal such as gold, silver, aluminum, copper, or tungsten. However, gold and silver are expensive and not realistic. Aluminum and copper are not sufficient in strength and tungsten is hard to be processed.

In particular, the heat conductivity of the iron-containing copper with the above composition ratio is about 364 W/(m·K) and high. Accordingly, if the lead frame is formed using the iron-containing copper, it is possible to improve the heat radiation performance of the light-emitting unit board. In this manner, even though the electric current supplied to the light-emitting device is increased, it is possible to decrease the temperature rise of the light-emitting device and increase the illumination brightness.

Further, when thickness of the lead frame of the light-emitting unit is t (mm), thickness of the light-emitting unit board is T (mm), thickness of the light-emitting device is D (mm), and height of a bonding wire is d (mm), it is desirable that the relationship among them be $0.1\text{ mm} \leq t \leq (T-D-d)$. Especially desirable range is $T/2 \leq t \leq (T-D-d)$.

Still further, when width of the lead frame of the light-emitting unit is W (mm), an interval of the lead frame is P (mm), and thickness of the lead frame is t (mm), it is desirable that the relationship among them be $P/2 \leq W \leq (P-t)$. Especially desirable range is $(P-2t) \leq W \leq (P-t)$.

The light-emitting unit according to a second invention is provided, in which at least a translucent light-emitting device, specifically a blue or green light-emitting diode (LED) is bonded with the lead frame by a transparent resin or a white resin. It is however to be noted that when bonding by the transparent resin is made, the lead frame surface existing thereunder has been silver-plated.

The silver plating or the white resin has a reflection factor higher than silver paste. Accordingly, by having such a structure, light emitted from the light-emitting device is efficiently emitted from the front surface thereof and as a result, quantity of light entering the light guide increases.

The light-emitting unit according to a third invention is provided, in which as material for the light-emitting unit board, resin is used of which the heat resistant temperature is higher than a melting point of lead-free solder which is used when soldering the lead frame to an electric circuit. Specifically, it is desirable that the resin such as polyphthalamide resin, polyphenylene sulfide resin, or liquid crystal polymer be used.

A melting point of the lead-free solder is 210~230° C. Since the melting point of the polyphthalamide resin is 290° C., that of polyphenylene sulfide resin (PPS) is 260~270° C., and that of the liquid crystal polymer is 220~230° C., each of them can fully stand the temperature in the case of soldering.

An illumination device using the light-emitting unit includes the illumination device in which a light-emitting unit is provided on the end face of a bar-shaped light guide, and light incident from the light-emitting unit is emitted from a light-emitting surface provided along the longitudinal direction while reflecting the light by the inner surface of the bar-shaped light guide or the illumination device in which the light-emitting unit is provided on the side of a plate-shaped light guide in the direction of the thickness, and light incident from the light-emitting unit is emitted from the upper or lower surface of the plate-shaped light guide while reflecting the light by the inner surface of the plate-shaped light guide.

Further, by incorporating the line illumination device in an image reading device, it is possible to increase the illumination brightness of a document and attain the speedup of image reading.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
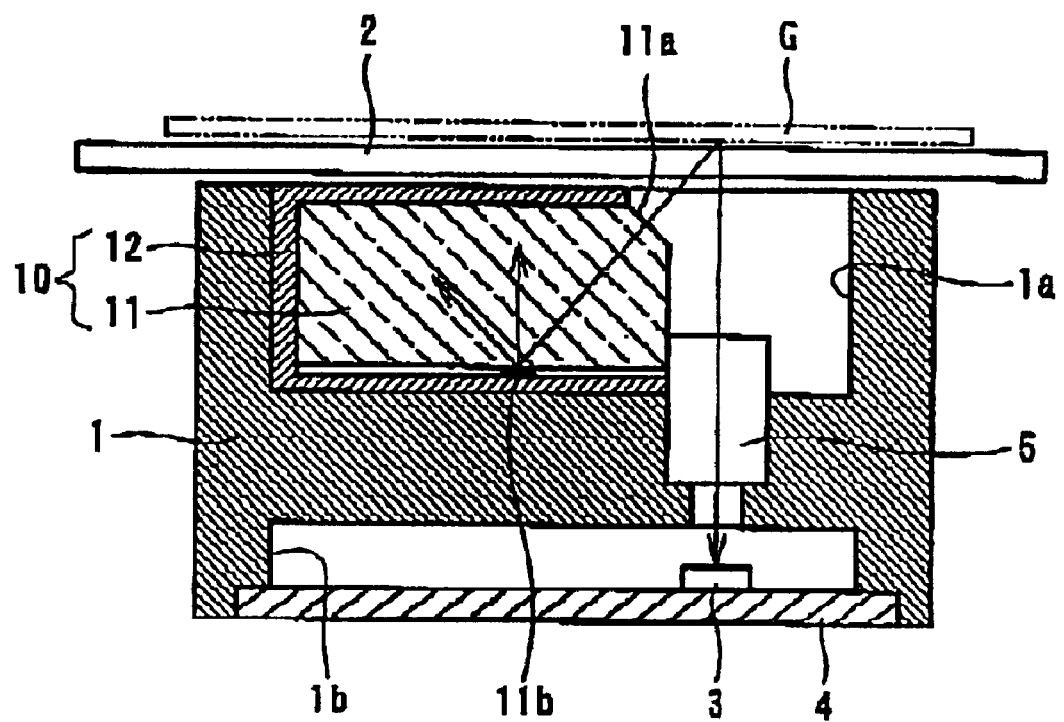
FIG. 1 is a cross-sectional view of an image-reading device incorporating a line illumination device therein.

A preferred embodiment of the present invention will now be described with reference to the accompanying drawings. As shown in FIG. 1, an image reading device is provided, in which a frame 1 is provided with depressions 1*a* and 1*b*. A line illumination device 10 is disposed within the depression 1*a*, and a sensor board 4 provided with a photoelectric conversion element (i.e., a line image sensor) 3 is disposed within the depression 1*b*. A rod lens array 5 for 1:1 image formation is also held within the frame 1. Provided above the frame 1 is a glass plate 2. Light emitted from a light-emitting surface 11*a* of the line illumination device 10 is projected onto a document G through the glass plate 2. The reflected light from the document G is then detected by the photoelectric conversion element (i.e., the image sensor) 3 through the rod lens array 5 to read the document G. The frame 1 is moved in a sub-scanning direction shown in FIG. 2 relative to the glass plate 2 to read a desired area of the document G.

Figure 2:
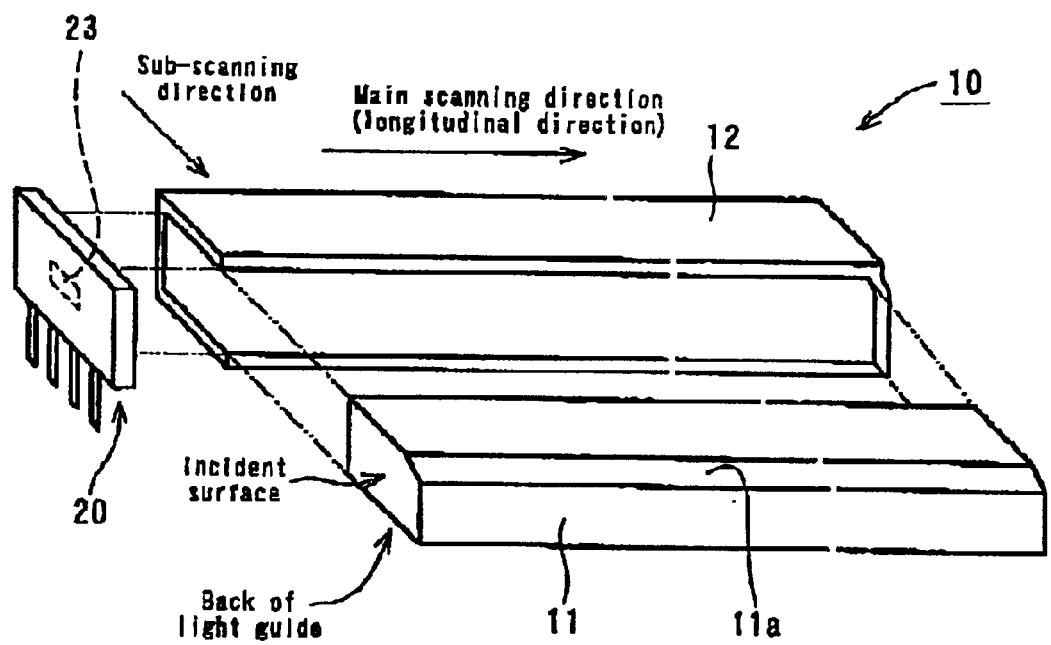
FIG. 2 is an exploded perspective view of the line illumination device.

As shown in FIG. 2, the line illumination device 10 is provided, in which a light guide 11 is housed within a white light guide casing 12 so that the light-emitting surface 11*a* is exposed. A light-emitting unit 20 provided with one or more light-emitting devices (e.g., LED) 23 is secured to one end of the light guide casing 12 as a light-emitting source. The light guide 11 is composed of translucent material such as glass or acrylic and its basic cross-sectional shape in the direction perpendicular to a main scanning direction (i.e., the longitudinal direction) is rectangular in which the corner section is C-chamfered to serve as the light-emitting surface 11a.

Figure 3:
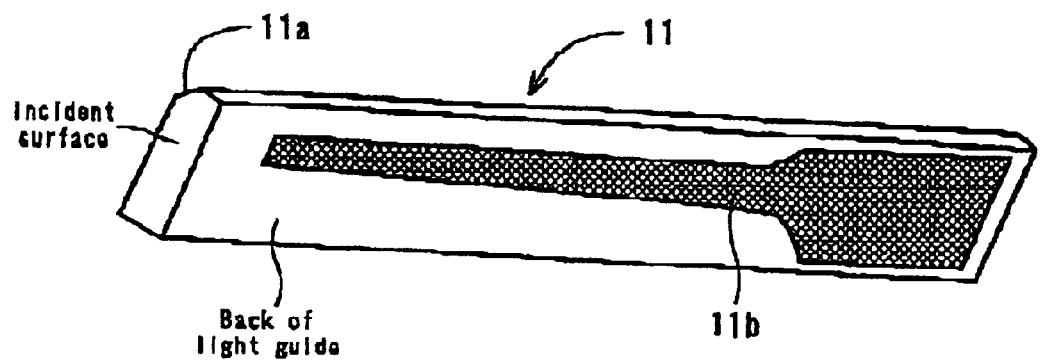
FIG. 3 is a perspective view showing one example of a light-scattering pattern provided on the back of a light guide.

A shown in FIG. 3, a light-scattering pattern 11b for scattering light from the light-emitting source incident from a light incident surface is formed on the back of the light guide 11 by screen-printing the white paints.

In this line illumination device 10, light from the light-emitting source is introduced into the light guide 11 from one end (i.e., the light incident surface) of the light guide 11. Light transmitted through the light guide 11 is scattered by the light-scattering pattern 11b formed on the back of the light guide and then, the scattered light is caused to emit from the light-emitting surface 11a (see FIG. 1).

The intensity of light incident from the light-emitting source is high or large on the side near the light-incident surface, while the light intensity is low or small as light goes further away from the light-incident surface. Now, as shown in FIG. 3, an area where the light-scattering pattern is formed is broadened as light goes further away from the light-incident surface. Thus, the strength of light emitted from the light-emitting surface 11a is kept constant over the entire length of the light guide 11 in the main scanning direction.

As shown in FIGS. 1 and 2, since the light guide 11 is covered by the light guide casing 12, it is not only possible to protect the light guide 11, but also to prevent the scattering light from being uselessly emitted out of the light guide. Thus, the intensity of light emitted can be increased.

Figure 4:
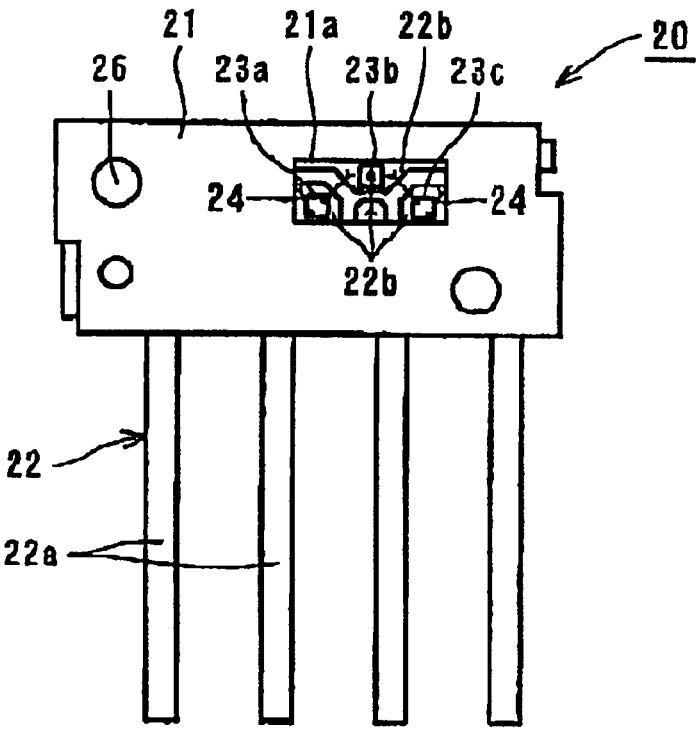
FIG. 4 is a front view of a light-emitting unit.
Figure 5:
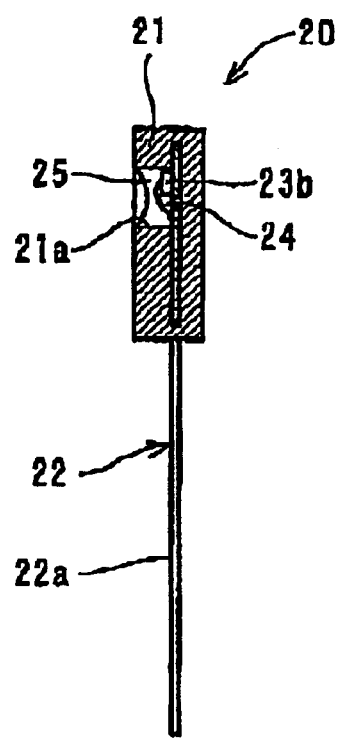
FIG. 5 is a sectional side view of the light-emitting unit.
Figure 6:
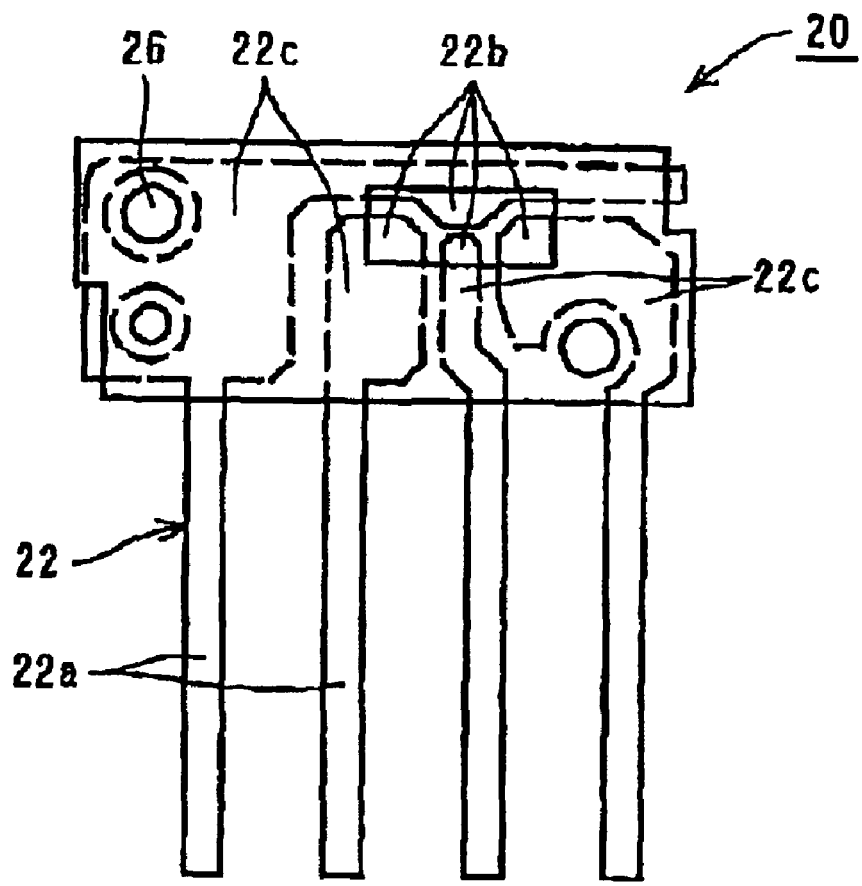
FIG. 6 is a perspective view showing a lead frame structure of the light emitting unit.

FIG. 4 is a front view of the light-emitting unit, FIG. 5 is a sectional side view of the light-emitting unit, and FIG. 6 is a perspective view showing a lead frame structure of the light-emitting unit.

A light-emitting unit board 21 is made by insert-molding a lead frame 22 onto a board resin and provided with an open window 21a for mounting light-emitting devices 23 (23a, 23b, and 23c). In particular, the light-emitting devices 23a and 23c are blue or green light-emitting diodes (LED), while the light-emitting device 23b is a red light-emitting diode (LED).

In the present embodiment, the light-emitting unit board 21 uses the resin such as polyphthalamide resin, polyphenylene sulfide resin, or liquid crystal polymer of which the heat-resistant temperature is higher than a melting point of lead-free solder described below as its material.

The lead frame 22 consists of a section (i.e., a lead terminal section) 22a exposed to supply the light-emitting devices 23 with an electric current from the outside, a section (i.e., a light-emitting device mounting and connecting section) 22b exposed within the open window 21a for mounting the light-emitting devices 23, and a section (i.e., an inner lead section) 22c hidden within the board resin. The lead terminal section 22a is soldered to the corresponding circuit (not shown). In the present embodiment, bonding is made using the lead-free solder.

The surface of the lead frame 22 is provided with silver plating to increase a reflection factor and to improve wire-bonding strength.

The light-emitting unit 20 is constructed in such a manner that the light-emitting devices 23 (i.e., 23a, 23b, and 23c) are bonded onto the lead frame 22b (i.e., the light-emitting device mounting and connecting section) exposed within the open window 21a of the light-emitting unit board 21. The light-emitting devices 23 (23a, 23b, and 23c) and the lead frame 22b are connected by a metal wire 24 and then, sealed by transparent resin 25. A through-bore 26 provided on the light-emitting unit board 21 is used to secure the light-emitting unit 20 to the light guide casing 12 when the line illumination device is assembled.

Figure 7:
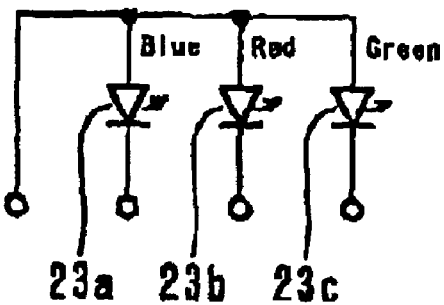
FIG. 7 is a wiring diagram of a light-emitting device within the light-emitting unit.

FIG. 7 is a wiring diagram of the light-emitting device within the light-emitting unit and shows an example of the line illumination device for color reading. The number, color, and wiring of the light-emitting device 23 to be mounted within the light-emitting unit 20 can be combined in various ways depending on the purpose of reading. When an electric current is sent to the light-emitting unit 20, the light-emitting devices 23 emit light. The electric current is increased to improve the light-emitting brightness.

Phosphor bronze has been used as the material for the lead frame 22, but in the present embodiment, iron-containing copper is used instead. A comparison of the iron-containing copper with the conventional material is made below:

| Composition (unit: wt/%) | |
|---|---|
| Iron-containing copper: | Fe: 0.1; P: 0.03; the rest: Cu |
| Phosphor bronze: | Sn: 6.0; P: 0.045; the rest: Cu |
| Heat conductivity [unit: W/(m · k)] | |
| Iron-containing copper: | 364 |
| Phosphor bronze: | 86.7 |

The iron-containing copper has the heat conductivity close to that i.e., 391 W/(m·k) of pure copper.

Figure 8:
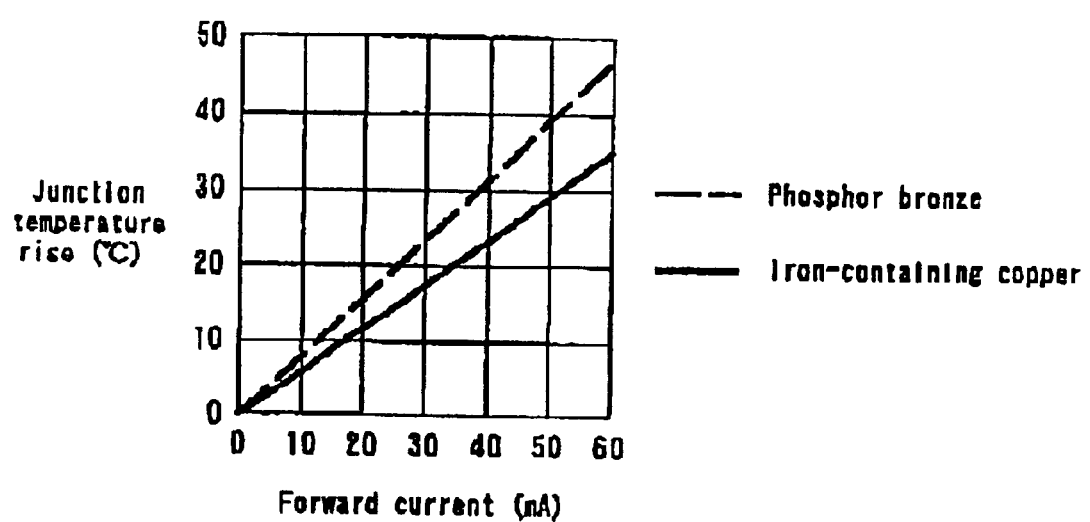
FIG. 8 is a graph showing measurement data of a junction temperature.

FIG. 8 is a graph showing measurement data of junction temperature. The material for the lead frame 22 is changed from phosphor bronze to iron-containing copper so that heat radiation characteristics can be improved and rise of junction temperature of the light-emitting devices 23 can be decreased. In this manner, current value sent in the same junction temperature can be increased by about 30%.

Figure 9:
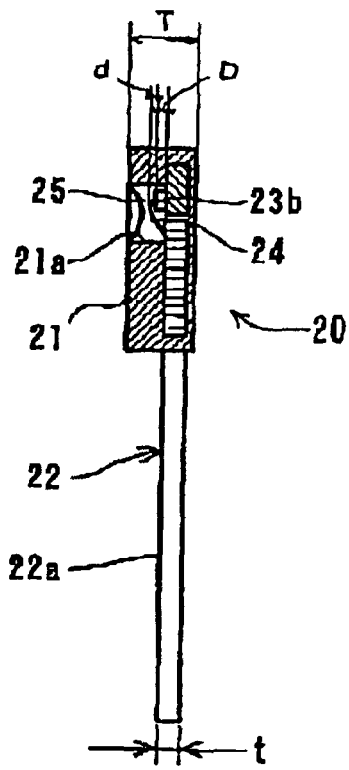
FIG. 9 is a view showing another embodiment of the lead frame.
Figure 10:
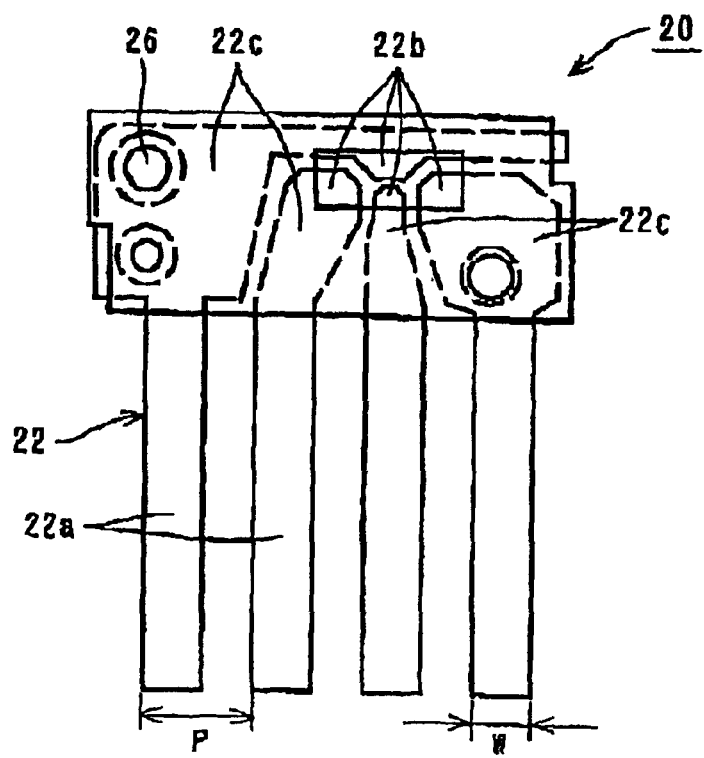
FIG. 10 is a view showing still further embodiment of the lead frame.

FIG. 9 is a view showing another embodiment of the lead frame and FIG. 10 is a view showing still further embodiment of the lead frame. As shown in FIG. 9, thickness t of the lead frame 22 can be increased to further improve the heat radiation characteristics. As far as the thickness t of the lead frame 22 is concerned, it can be increased to the size whereby the thickness D of the light-emitting device 23 and the height d of a bonding wire are deducted from the thickness T of the light-emitting unit board 21. From the point of view of the lead frame strength, it is necessary that the thickness t is 0.1 mm or more. Specifically, the thickness t is $0.1 \text{ mm} \leq t \leq (T-D-d)$. More desirable range is $T/2 \leq t \leq (T-D-d)$.

As shown in FIG. 10, width W of the outer lead terminal section 22a of the lead frame 22 can be broadened to further improve the heat radiation characteristics. As far as the width W is concerned, it can be broadened up to the intervals whereby each lead frame does not short-circuit. However, taking the productivity in consideration, it is desirable that the width be increased up to the size whereby the thickness t is deducted from the interval P of the lead frame. Specifically, the width W (mm) is $P/2 \leq W \leq (P-t)$. More desirable range is $(P-2t) \leq W \leq (P-t)$.

Figure 11:
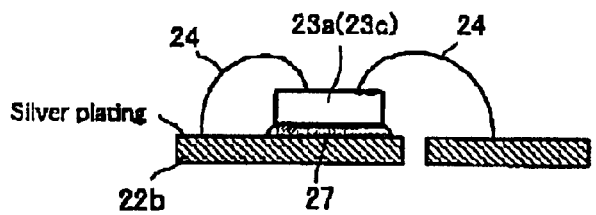
FIG. 11 is an enlarged cross-sectional view of a junction section of the light-emitting device and the lead frame.

FIG. 11 is an enlarged cross-sectional view of the joint between the blue or green light-emitting device 23a or 23c of the light-emitting devices and the lead frame 22b. The blue or green light-emitting device 23a or 23b is translucent and bonded with the lead frame 22b by transparent resin (e.g., epoxy resin) 27. It is to be noted that since the blue or green light-emitting device 23a or 23b is provided with an insulating substrate such as sapphire, there are provided two electrodes on the surface side which are connected by two metal wires 24.

On the other hand, the red light-emitting device 23b is provided with a non-transparent GaAs substrate. Since there are provided electrodes on both the surface and the back of the substrate, only one metal wire 24 is provided as shown in FIG. 5.

As described above, by using the transparent resin 27 as an adhesive agent, light transmitted through the light-emitting device among light emitted from the light-emitting device 23a or 23c is reflected by silver plating provided on the surface of the lead frame 22b. Then, the light is again transmitted through the light-emitting device and emitted from the front surface, resulting in increasing quantity of light.

White resin (e.g., epoxy resin or silicon resin) can be used in place of the transparent resin 27. In this case, the reflecting surface is the surface of the white resin in place of the silver plating provided on the surface of the lead frame 22b. Accordingly, when the white resin is used, the surface of the lead frame 22b is not necessarily provided with the silver plating.

Figure 12:
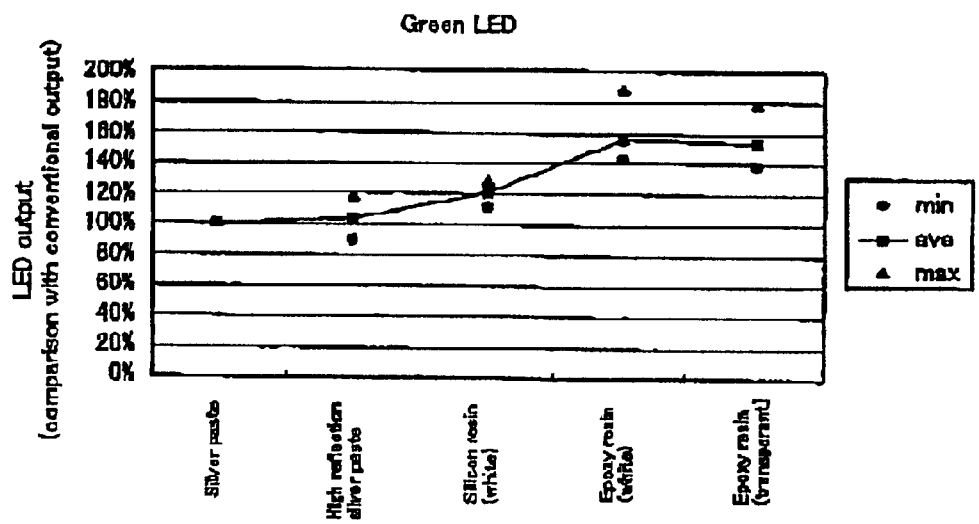
FIGS. 12(*a*) and (*b*) are graphs showing the experimental results of the relationship between a kind of adhesive resin and LED output regarding a green LED and a blue LED.
Figure 12:
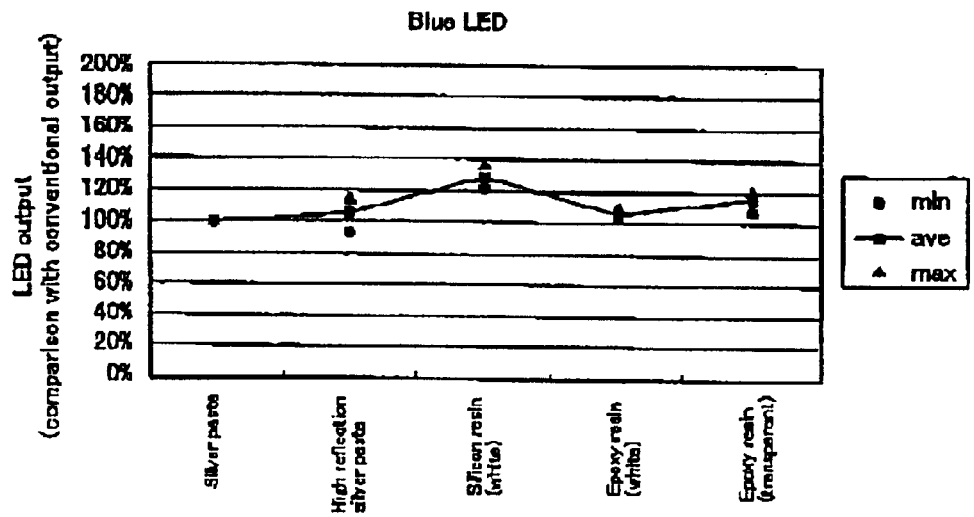

FIGS. 12(a) and (b) are graphs showing experimental results of the relationship between a kind of adhesive resin and the output of LED regarding the green LED and Blue LED. As is apparent from these graphs, it is to be noted that when transparent or white resin is used as an adhesive agent, the LED output remarkably improves compared with conventional silver paste.

Figure 13:
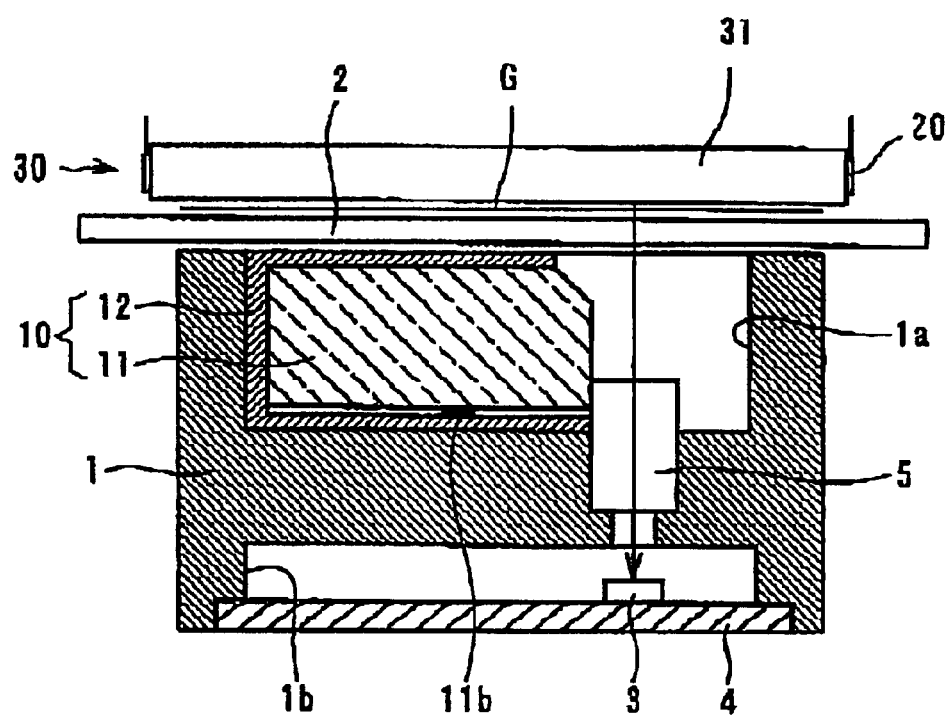
FIG. 13 is a cross-sectional view showing another embodiment of the image-reading device.
Figure 14:
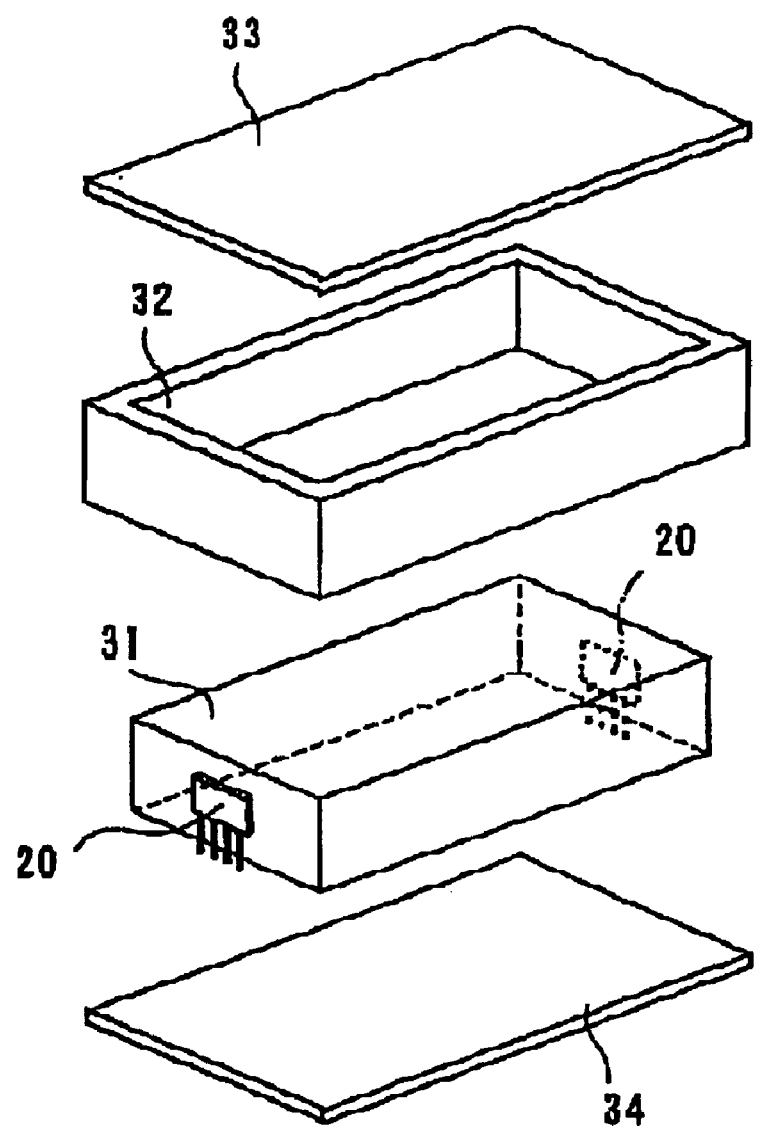
FIG. 14 is an exploded perspective view of an illumination device incorporated in FIG. 13.
Figure 15:
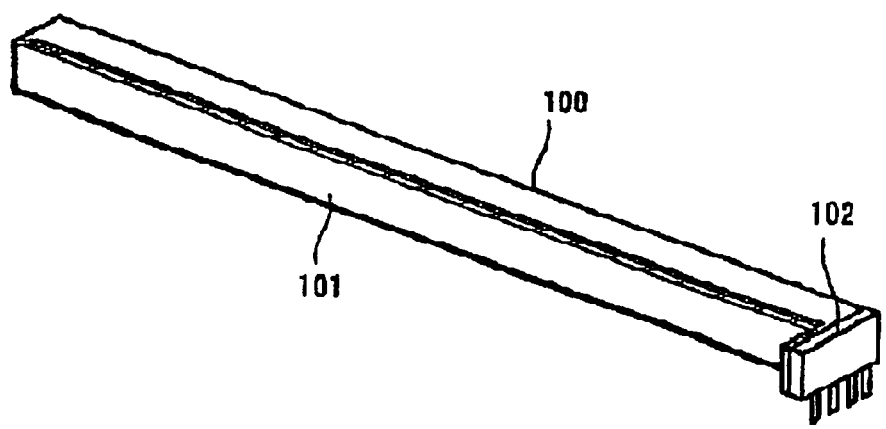
FIG. 15 is a perspective view of a conventional line illumination device.
Figure 16:
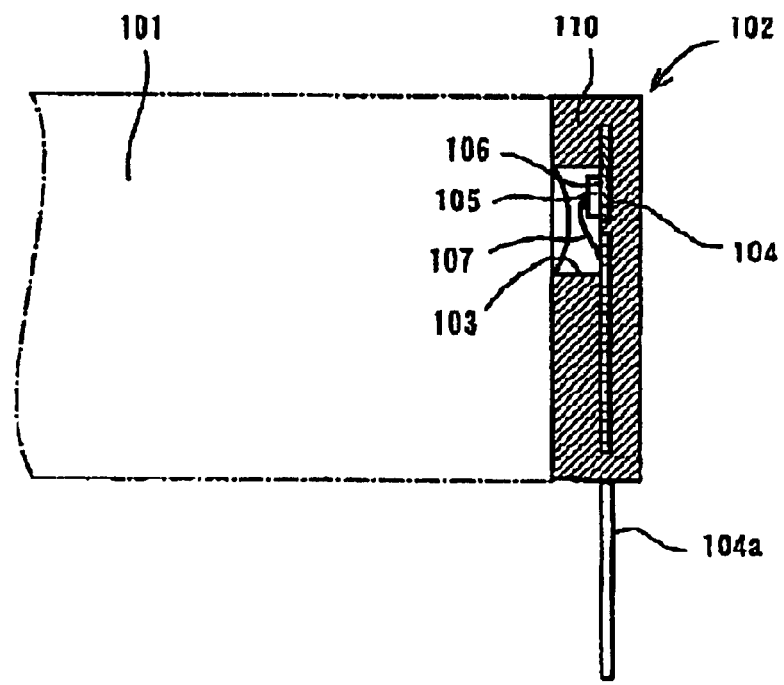
FIG. 16 is a cross-sectional view of a conventional light-emitting unit.

FIG. 13 is a cross-sectional view showing another embodiment of the image reading device and FIG. 14 is an exploded perspective view of the illumination device incorporated in FIG. 13. In the image reading device shown in FIG. 1, the reflected light from the document G is detected by the photoelectric conversion element (i.e., the line image sensor) 3 through the rod lens array 5. However, in the present embodiment, in addition to the above-mentioned function, an illumination device 30 is disposed above an OHP document G etc. so that the light transmitted through the document G can also be read by the photoelectric conversion element 3. In this embodiment, a frame 1 can also be moved relative to a glass plate 2 to read the desired area of the document G in the same manner as the reading device shown in FIG. 1.

The illumination device 30 is provided with the light-emitting unit 20 on the side of a plate-shaped light guide 31 made of transparent acrylic resin in the direction of the thickness. The plate-shaped light guide 31 is housed within a white casing 32. A white reflection plate 33 is provided on the upper surface of the light guide 31 serving as a reflection surface, while a diffusion sheet 34 is provided on the lower surface of the light guide 31 serving as a light-emitting surface.

As described above, according to a first invention, it is possible to improve heat radiation performance of the light-emitting unit board. Accordingly, even though an electric current supplied to the light-emitting device is caused to increase, it is possible to decrease the rise in temperature of the light-emitting device and increase the illumination brightness. Further, when the line illumination device according to the present invention is incorporated in the image reading device, it is possible to increase the illumination brightness of the document and attain the speedup of the image reading.

According to a second invention, the transparent resin or the white resin is used in place of the conventional silver paste as the adhesive agent for bonding the light-emitting device with the lead frame. Accordingly, by causing the light going or escaping backward out of the translucent light-emitting device board to reflect forward, it is possible to improve the luminous efficiency and increase the illumination brightness.

As a result, by incorporating the line illumination device according to the present invention in the image reading device, it is possible to increase the illumination brightness of the document and also attain the speedup of the image reading.

According to a third invention, the light-emitting unit board is made of heat resisting resin such as polyphthalamide resin, polyphenylene sulfide resin, or liquid crystal polymer. Accordingly, it is possible for the light-emitting unit board to fully stand the heat in the case where the lead frame is bonded with the corresponding circuit using the lead-free solder and to improve the reliability.

What is claimed is:

1. A light-emitting unit having a light-emitting device mounted on a light-emitting unit board which is provided with a lead frame, characterized in that when width of the lead frame is W (mm), an interval of the lead frame is P (mm), and thickness of the lead frame is t (mm), the relationship among them is $P/2 \leq W \leq (S-t)$, and when thickness of the lead frame is t (mm), thickness of the light-emitting unit board is T (mm), thickness of the light-emitting device is D (mm), and height of a bonding wire is d (mm), the relationship among them is $0.1 \text{ mm} \leq t \leq (T-D-d)$.

2. An illumination device designed to emit light incident from a light-emitting unit which is provided on an end face of a bar-shaped light guide in the longitudinal direction from a light-emitting surface provided along the longitudinal direction while reflecting the light by the inner surface of the bar-shaped light guide, wherein the light-emitting unit is specified by claim 1.

3. An image reading device comprising the illumination device according to claim 2, a line image sensor, and a rod lens array for converging the reflected light or transmitted light from a document on the line image sensor, wherein each of them is incorporated within a frame.

4. An illumination device designed to emit light incident from a light-emitting unit which is provided on a side of a plate-shaped light guide in the direction of the thickness from the upper or lower surface of the plate-shaped light guide while reflecting the light by the inner surface of the plate-shaped light guide, wherein the light-emitting unit is specified by claim 1.

5. An image reading device comprising the illumination device according to claim 4, a line image sensor, and a rod lens array for converging the reflected light or transmitted light from a document on the line image sensor, wherein each of them is incorporated within a frame.

* * * * *